(12) United States Patent
Jarrot et al.

(10) Patent No.: US 10,082,942 B2
(45) Date of Patent: Sep. 25, 2018

(54) TELEMETRY DIAGNOSTICS

(71) Applicant: Schlumberger Technology Corporation, Sugar land, TX (US)

(72) Inventors: Arnaud Jarrot, Somerville, MA (US); Sandra Reyes, Gloucester (GB); Remi Hutin, Bures sur Yvette (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 27 days.

(21) Appl. No.: 14/663,401

(22) Filed: Mar. 19, 2015

(65) Prior Publication Data

US 2015/0275659 A1    Oct. 1, 2015

Related U.S. Application Data

(60) Provisional application No. 61/970,855, filed on Mar. 26, 2014.

(51) Int. Cl.

| | |
|---|---|
| *E21B 44/00* | (2006.01) |
| *G06F 3/0484* | (2013.01) |
| *E21B 47/18* | (2012.01) |
| *E21B 47/12* | (2012.01) |
| *H04L 29/08* | (2006.01) |
| *G06Q 50/00* | (2012.01) |

(Continued)

(52) U.S. Cl.
CPC .......... *G06F 3/04847* (2013.01); *E21B 44/00* (2013.01); *E21B 47/122* (2013.01); *E21B 47/18* (2013.01); *G06F 3/04842* (2013.01); *G06Q 50/01* (2013.01); *H04L 67/10* (2013.01); *H04L 67/12* (2013.01); *E21B 47/00* (2013.01); *E21B 47/12* (2013.01); *E21B 49/00* (2013.01); *E21B 49/003* (2013.01); *G01V 13/00* (2013.01)

(58) Field of Classification Search
CPC .......... E21B 44/00; E21B 47/00; E21B 47/12; E21B 49/00; E21B 49/003; G01V 13/00
USPC .................. 702/183, 182; 340/853.2; 367/86
See application file for complete search history.

(56) References Cited

U.S. PATENT DOCUMENTS

| 6,944,547 B2 | 9/2005 | Womer et al. |
|---|---|---|
| 2005/0046591 A1 | 3/2005 | Pacault et al. |

(Continued)

FOREIGN PATENT DOCUMENTS

| WO | 2004/090285 | 10/2004 |
|---|---|---|
| WO | 2009/058635 | 5/2009 |

(Continued)

OTHER PUBLICATIONS

International search report for the equivalent PCT patent application No. PCT/US2015/021631 dated Jun. 18, 2015.

*Primary Examiner* — Benyam Haile

(57) ABSTRACT

A technique facilitates diagnosis of a telemetry system, such as a mud pulse telemetry system or an electro-magnetic telemetry system. The technique comprises operating a telemetry system in a wellbore and collecting a variety of data. The data may relate to a rig state, a downhole state, a signal state, a surface state, and/or other suitable types of data. The data is processed to determine whether states of operation indicated by the data match states indicating a problem with operation of the telemetry system. If a problem is detected, appropriate information regarding the problem is transmitted for use in correcting the problem.

16 Claims, 3 Drawing Sheets

(51) Int. Cl.
*E21B 49/00* (2006.01)
*G01V 13/00* (2006.01)
*E21B 47/00* (2012.01)

(56) References Cited

U.S. PATENT DOCUMENTS

| | | |
|---|---|---|
| 2006/0001549 A1 | 1/2006 | Shah et al. |
| 2009/0177404 A1* | 7/2009 | Hartmann ................ E21B 47/00 702/9 |
| 2010/0161227 A1 | 6/2010 | Deere |
| 2012/0290206 A1 | 11/2012 | Hartmann et al. |
| 2014/0240140 A1* | 8/2014 | Switzer ................ E21B 47/122 340/854.6 |
| 2014/0326505 A1* | 11/2014 | Davis ................ E21B 47/0002 175/24 |
| 2015/0107901 A1* | 4/2015 | Eriksson ................ E21B 47/12 175/40 |
| 2015/0240619 A1* | 8/2015 | Frosell ................ E21B 47/091 166/250.01 |
| 2016/0003035 A1* | 1/2016 | Logan ................ E21B 47/12 340/854.6 |

FOREIGN PATENT DOCUMENTS

| | | |
|---|---|---|
| WO | 2009/089150 | 7/2009 |
| WO | 2009/132281 | 10/2009 |

\* cited by examiner

TELEMETRY DIAGNOSTICS

CROSS-REFERENCE TO RELATED APPLICATIONS

The present document is based on and claims priority to U.S. Provisional Application Ser. No. 61/970,855, filed Mar. 26, 2014, which is incorporated herein by reference in its entirety.

BACKGROUND

In many hydrocarbon well applications, telemetry systems are used to transfer information. Mud pulse telemetry systems utilize a technology that sends digital information via pulses between a bottom of a well and a surface of the well. The mud pulse telemetry may be used to transfer information during measurement-while-drilling operations or logging-while-drilling operations.

SUMMARY

In general, a system and methodology are provided which facilitate diagnosis of a telemetry system, such as a mud pulse telemetry system or an electro-magnetic telemetry system. The technique comprises operating a telemetry system in a wellbore and collecting a variety of data. The collecting of data may comprise collecting data related to a rig state, a downhole state, a signal state, a surface state, and/or other suitable types of data. The data is processed to determine whether states of operation indicated by the data match states indicating a problem with operation of the telemetry system. If a problem is detected, appropriate information related to the problem is transmitted for use in correcting the problem.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for diagnosis of a telemetry system. The telemetry system may be a well system configured to transmit signals along a wellbore in the form of pulses, e.g. a mud pulse telemetry system, or other signals, e.g. an electro-magnetic telemetry system. However, the technique may be used with other types of telemetry systems. The technique comprises operating a telemetry system in a wellbore and collecting a variety of data. Examples of data collected include data related to a rig state, a downhole state, a signal state, a surface state, and/or other suitable types of data. The data is processed to determine whether states of operation represented by the data match predetermined states indicating a problem with operation of the telemetry system. If a problem is detected, appropriate information related to the problem is transmitted for use in correcting the problem.

In embodiments described herein, the technique may be employed to improve the performance and reliability of a mud pulse telemetry system, an electro-magnetic telemetry system, or other types of telemetry systems. Mud pulse telemetry is a technology for sending digital information via pulses that create waves, e.g. acoustic waves, which travel along a wellbore. For example, mud pulse telemetry may be used to transmit signals from a bottom of a well to a surface, e.g. to a surface control system. Mud pulse telemetry is useful during, for example, measurement-while-drilling (MWD) operations or logging-while-drilling (LWD) operations.

As described in greater detail below, the technique provides an expert system able to provide real-time information regarding telemetry to an operator, e.g. field engineer, and/or to a control system. The expert system provides early detection of a problem, e.g. early failure detection, and facilitates troubleshooting when telemetry problems occur. The telemetry issues often can be identified early and properly addressed at an early stage to reduce the risk of telemetry system failure.

Figure 1:
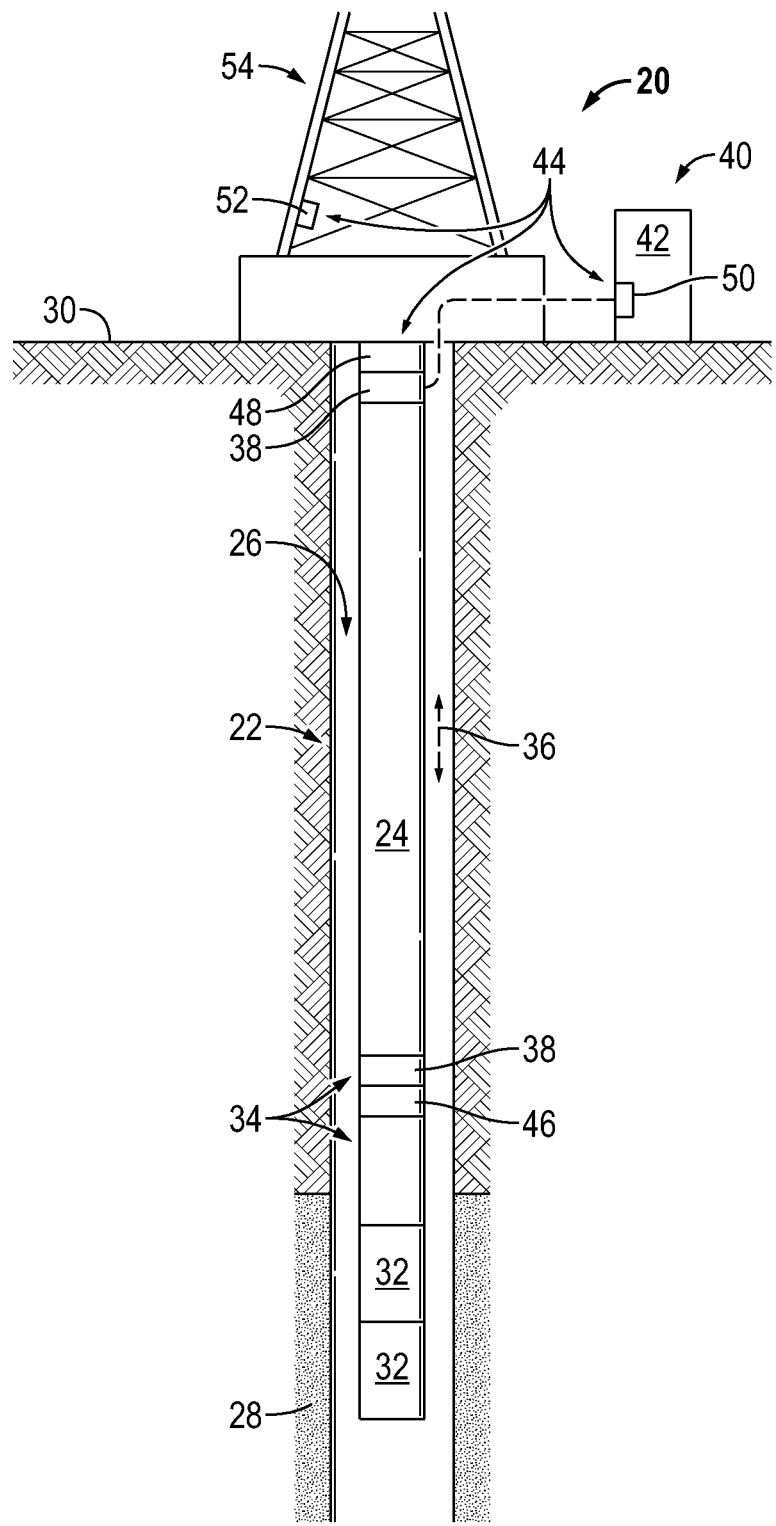
FIG. 1 is a schematic illustration of a well system comprising an example of a telemetry system employed to transfer information along a wellbore, according to an embodiment of the disclosure.

Referring generally to FIG. 1, a well system 20 is illustrated for use in a well 22. The well system 20 comprises a well string 24 deployed in a wellbore 26 extending into or through a subterranean formation 28. The subterranean formation 28 may bear desirable production fluids, such as oil or gas. The wellbore 26 extends down from a surface location 30 and may comprise a generally vertical wellbore and/or a deviated wellbore, e.g. a horizontal wellbore.

In some embodiments, the well string 24 is in the form of a drilling string and may comprise a variety of well tools 32. Examples of well tools include drilling systems, steering systems, measurement-while-drilling systems, logging-while-drilling systems, and/or other systems and components selected for a given operation. The well system 20 also comprises a telemetry system 34, e.g. a mud pulse telemetry system or an electro-magnetic telemetry system, which sends telemetry signals along wellbore 26, as represented by arrow 36. The telemetry system 34 also may comprise appropriate transceivers 38 configured to send and receive the telemetry signals, e.g. mud pulse signals. In some applications, telemetry system 34 may comprise other types of telemetry systems, e.g. electro-magnetic telemetry systems or acoustic telemetry systems.

The well system 20 also comprises a diagnostic system 40 which monitors data to detect problems, e.g. operational issues, that may arise with respect to telemetry system 34 and then takes a suitable action regarding the problem. For example, the diagnostic system 40 may output information to an operator and/or send appropriate signals downhole to make appropriate adjustments to the telemetry system 34 and/or adjustments to other downhole components in an effort to address the problem. By way of example, the diagnostic system 40 may comprise a control system 42 which receives data from a sensor network 44 having a plurality of sensors. Examples of the sensors in network 44 include downhole sensors 46, surface sensors 48, and telemetry sensors 50. If well string 24 comprises a drill string, the sensor network 44 also may comprise rig sensors 52 located to monitor parameters in a rig 54.

The sensors 46, 48, 50 and 52 monitor selected parameters and collect data related to, for example, a downhole state, a surface state, a telemetry signal state, and a rig state. The data from sensor network 44 is processed by control system 42 to determine whether the various states of operation monitored by sensors 46, 48, 50 and 52 match predetermined states stored on control system 42 as indicative of a telemetry system problem. If the monitored states match a predetermined problem state, the control system 42 is configured to output an alarm or other suitable information to an operator to enable corrective action to be taken at an early stage. In some applications, the control system 42 may be programmed or otherwise configured to address at least certain problems/issues automatically by sending appropriate control signals downhole to telemetry system 34 or to other suitable downhole systems or components.

The diagnostic system 40 may be run in real-time to provide early warning to an operator and/or to enable early corrective action. Depending on the application, the diagnostic system 40 may be configured to monitor a variety of data for detection of specific events. In some applications, diagnostic system 40 is operated to detect classes of events. Examples of such classes of events include detection of telemetry parameters which are not well-suited to a current operational environment, e.g. an operational environment having excessive telemetry interference due to mud pump noise or electrical noise. Another class of events includes detection of the occurrence of a telemetry failure, e.g. a telemetry failure due to jamming or the loss of a telemetry signal. With respect to the former class of events, the diagnostic system 40 facilitates detection of problems as early as possible to prevent future issues, e.g. failures, of the telemetry system. With respect to the latter class of events, the diagnostic system 40 is able to provide information related to the failure so that corrective action may be taken as early as possible.

Figure 2:
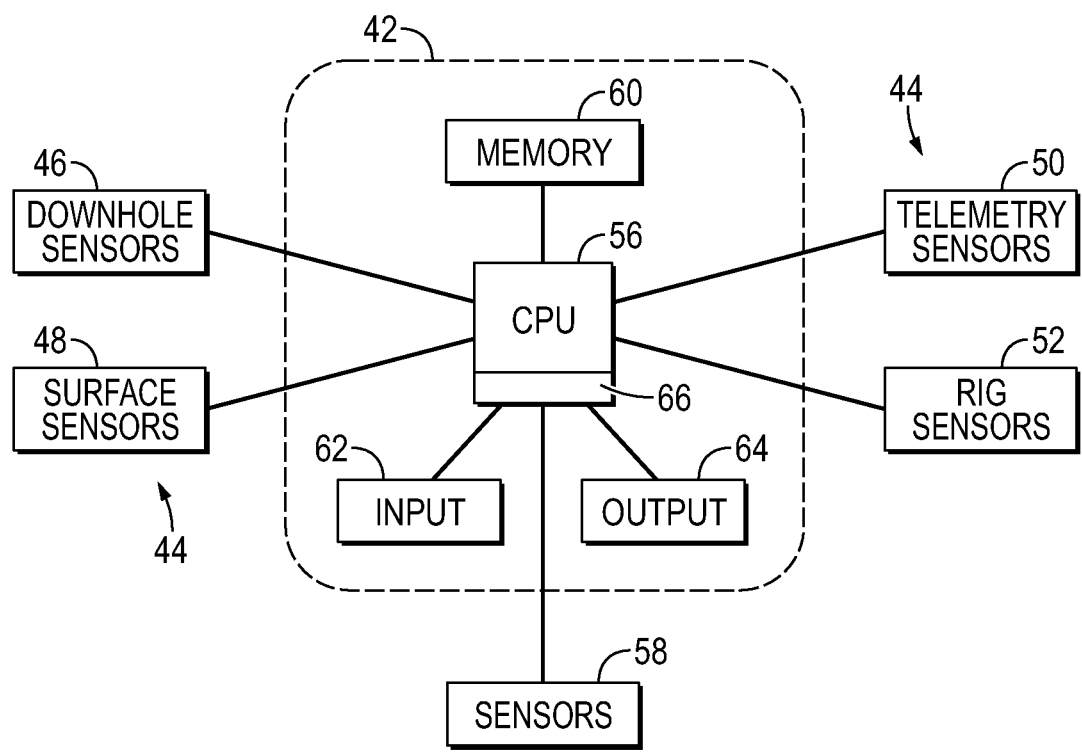
FIG. 2 is a schematic illustration of a processing system which may be used to process data obtained from sensors located to monitor states of operation affecting the telemetry system, according to an embodiment of the disclosure.

Depending on the application, control system 42 may have a variety of configurations and may work in cooperation with many types of sensor networks 44. Referring generally to FIG. 2, an example of control system 42 is illustrated. In this embodiment, control system 42 may be a processor-based system, such as a computer system, which receives data via sensor network 44 to determine various states of operation and to compare those actual states to predetermined states indicative of a problem. Examples of predetermined states indicative of problems include mud pump noise in a specific telemetry band which causes interference with the telemetry signals 36; electrical noise which interferes with telemetry signals 36; jamming of the telemetry signal; or loss of the telemetry signal.

In FIG. 2, an example of a processor-based control system 42 is illustrated. In this example, the system 42 comprises a processor 56 in the form of a central processing unit (CPU). The processor 56 is operatively employed to intake and process data obtained from the sensors 46, 48, 50, 52, and/or other sensors 58 of sensor network 44. The sensors of sensor network 44 are positioned to monitor various operational states at selected locations or in conjunction with selected systems. By way of example, the sensors of sensor network 44 may be selected and positioned to monitor a rig state, a downhole state, a signal state, and a surface state to detect parameters indicative of problems with telemetry system 34.

In the example illustrated in FIG. 2, the processor 56 also may be operatively coupled with a memory 60, an input device 62, and an output device 64. Memory 60 may be used to store many types of data, such as data collected and updated via sensor network 44. Input device 62 may comprise a variety of devices, such as a keyboard, mouse, voice recognition unit, touchscreen, other input devices, or combinations of such devices. Output device 64 may comprise a visual and/or audio output device, such as a computer display, monitor, or other display medium having a graphical user interface. Additionally, the processing may be done on a single device or multiple devices locally, at a remote location, or with some local devices and other devices located remotely.

The processor-based control system 42 is able to work with a variety of software modules 66 which are designed to compare the actual states of operation occurring in real-time with predetermined states which may be stored, for example, in memory 60. If a match occurs between an actual monitored state and a stored state indicative of a telemetry problem, appropriate information is output to, for example, output device 64. The output information may be information displayed on a computer display or it may be an alarm or other suitable output which provides an operator with notice. As discussed above, processor 56 may be programmed to automatically take corrective action in some applications.

Depending on the specifics of a given well application, control system 42 and the sensor network may be constructed to monitor and detect a variety of operational states for changes in state indicative of a telemetry event detrimentally affecting telemetry system 34. By way of example, sensor network 44 may utilize pressure sensors, stroke sensors, hook load sensors, and other types of sensors. Additionally, sensor network 44 may comprise telemetry sensors 50 able to extract information contained on the telemetry waveform. The information may be extracted using standard or advanced signal processing detection methods, e.g. spectrum analysis, spectrograms, or other signal processing detection methods. The extracted data may then be correlated with information from, for example, downhole sensors 46, surface sensors 48, and rig sensors 52 which may be used to provide tool data, quality of demodulation data, true vertical depth (TVD) data, and other data. Control system 42 is employed to analyze this data, to determine whether the data related to actual states matches data indicative of a telemetry problem, and to take corrective action, e.g. output information on the problem to an operator.

Figure 3:
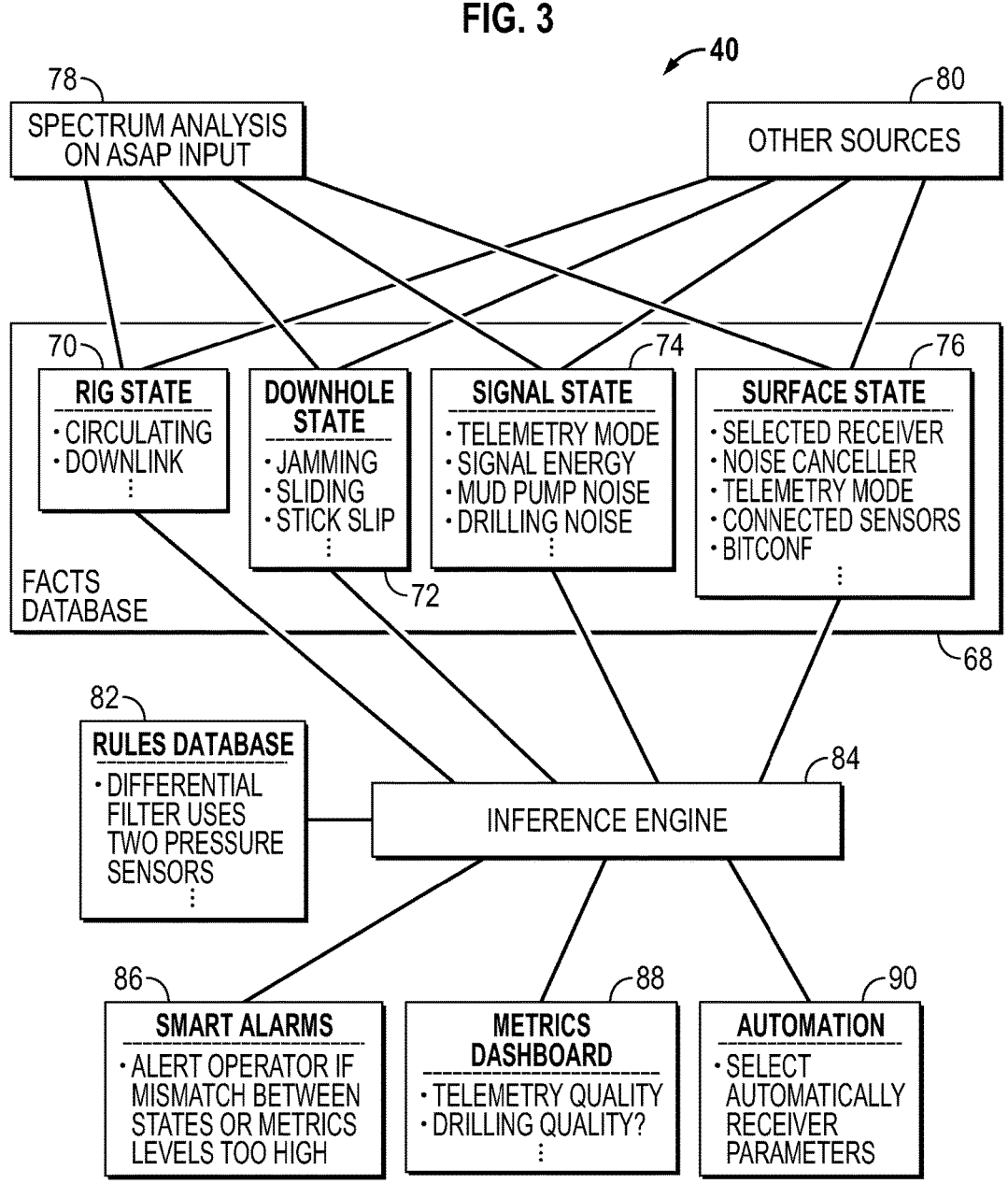
FIG. 3 is a diagrammatic illustration of an example of a telemetry diagnostics expert system, according to an embodiment of the disclosure.

The telemetry diagnostic system 40 is a system able to evaluate complex system behavior and to diagnose that complex system behavior for indications of telemetry problems. FIG. 3 provides a diagrammatic example of an expert telemetry diagnostic system 40. In this example, the diagnostic system 40 comprises a facts database 68 which may be stored on, for example, memory 60 of control system 42. The facts database contains the different stored states of the telemetry chain which may be indicative of a problem/issue with telemetry system 34.

By way of example, the facts database 68 comprises rig state data 70 which includes the different stored states related to rig operation that may have an impact on the quality of the telemetry signal. Examples of the different stored rig states may comprise data related to pumping/circulating, downlink, drilling, and/or other data that may affect telemetry. The facts database 68 also may comprise downhole state data 72 which includes states that are related to the drilling tools and drilling bit. Examples of the different stored downhole states may comprise data related to signal jamming, tool sliding, turbine RPM of the drilling system, tool stick-slip, and/or other data that may affect telemetry. The facts database 68 also may comprise signal state data 74 which includes different states related to the telemetry signal and noise at the surface. Examples of the different stored signal states may comprise signal energy, mud pump noise, drilling noise, telemetry mode, and/or other data that may affect telemetry. Additionally, the facts database may comprise surface state data 76 which includes states of the surface system. Examples of the different stored surface states may comprise selected telemetry mode, types of sensors connected, selected receivers/transceivers, types of noise cancelers, and/or other data that may affect telemetry.

The various states 70, 72, 74, 76 stored on facts database 68 may be updated. For example, the states data may be updated by using information obtained from processed waveforms e.g. using information obtained from a spectrum analysis 78. The stored states data also may be updated from a variety of other sources 80 available at the surface. The data from other sources 80 may comprise decoded information from the drilling tool, event detection data (e.g. QeD data), surface monitoring data (e.g. HSPM data), data-driven alarms, data obtained via an inference engine in the case of interdependent states, i.e. states that depend on the validity of other states, and/or other data sources.

In this example, the diagnostic system 40 further comprises a rules database 82 which may be contained in software modules 66. The rules database 82 comprises logical rules that link the system states, e.g. states 70, 72, 74 and 76. The rules database 82 further describes causality links between the various states. An inference engine 84 also may be part of software module or module 66 and serves as the logical entity in charge of matching the actual states of operation with the stored data states 70, 72, 74 and 76 to determine whether a match exists as an indication of a problem with operation of the telemetry system 34. In addition to matching the states, the inference engine 84 is configured to infer the rules that apply to the current context with respect to operation of the well system 20 in a given environment. The inference engine 84 is part of (or works in cooperation with) CPU 56 to process the data received from sensor network 44 and to determine matches with the stored states for a given context.

The inference engine 84/CPU 56 also may be used to provide different levels of interaction with an operator and/or to provide certain amounts of automation in automatically responding to specific matches with stored states indicating a problem with the telemetry system 34. In some applications, the interaction comprises output of a smart alarm 86. The smart alarm alerts an operator if a set of conditions is abnormal and may harm the telemetry signal, e.g. an alarm is provided upon detection of noise in a telemetry band. If a known scenario is identified, the smart alarm 86 also may be utilized to propose a solution, e.g. a solution to improve demodulation.

The interaction also may comprise output of a metrics dashboard 88 on, for example, output display 64. The metrics dashboard 88 provides quantitative information about the telemetry to an operator. The quantitative information may contain different items that are associated to a metric, e.g. bit confidence in percentage terms, telemetry signal in psi, pump rate in SPM. In some applications, the operator is able to interact with the output display 64 (or other output device) to select which item should be displayed and the operator can be alerted if an item value is above a predefined threshold, thus indicating an abnormal condition and problem with the telemetry system. Additionally, the interaction may comprise output by the inference engine 84/CPU 56 in the form of telemetry parameters automation 90, such as a surface automation agent, e.g. an HSPM agent. For example, based on detected events, telemetry parameter automation may involve the automatic selection of desired telemetry parameters to optimize performance of telemetry system 34. In some applications, the diagnostic system 40 may be programmed to automatically improve the choice of demodulation channels with respect to the telemetry signal.

Depending on the application, well system 20 may have a variety of configurations with other and/or additional components. For example, additional or other drilling components, steering systems, tubular systems, circulation systems, and/or other components or systems may be used in well system 20. Similarly, the well system 20 can be used in drilling operations and other well related operations in which signals are transmitted along the wellbore. The telemetry system 34 may utilize pulses, e.g. acoustic pulses, or other types of pulses to carry the signal. In some applications, however, other types of signals may be used for writing telemetry. In various drilling applications, for example, telemetry system 34 may comprise other types of measurement-while-drilling telemetry systems, such as an electro-magnetic telemetry system or another type of acoustic telemetry system. Additionally, the sensors, sensor network, control system, and overall diagnostic system may have a variety of components, configurations, programming, and/or software modules depending on the parameters of a given application.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for diagnosing a telemetry system deployed in a drilling system, the method comprising:
    deploying a drill string in a subterranean wellbore, the wellbore extending downhole from a rig at a surface location, the drill string including a telemetry system, the telemetry system in communication with a surface control system;
    operating the telemetry system to transmit signals from a bottom of the wellbore to the surface location;
    collecting first, second, third, and fourth sensor data into a facts database, the first sensor data obtained from a rig sensor, the second sensor data obtained from a downhole sensor, the third sensor data obtained from a telemetry sensor, and the fourth sensor data obtained from a surface sensor;
    providing a rules database including a plurality of logical rules that link states of operation of the drilling system
    processing the data in the facts database in combination with the logical rules via an inference engine to determine whether states of operation indicated by the data match states indicating a problem with operation of the telemetry system;

outputting an indication of the problem to an operator at the surface; and wherein the surface control system is further configured to automatically address the problem by sending control signals downhole to the telemetry system at the bottom of the wellbore.

2. The method as recited in claim 1, wherein the telemetry system comprises a mud pulse telemetry system configured to transmit mud pulse signals to the surface control system.

3. The method as recited in claim 1, wherein the telemetry system comprises an electro-magnetic telemetry system configured to transmit electro-magnetic signals to the surface control system.

4. The method as recited in claim 1, wherein collecting the first, second, third, and fourth sensor data comprises collecting the data into the facts database and updating the data on the database during an operation utilizing the telemetry system.

5. The method as recited in claim 1, wherein the processing comprises processing the data to determine whether telemetry parameters are not well-suited for a current operational environment.

6. The method as recited in claim 1, wherein the processing comprises processing the data to determine whether a telemetry failure has occurred.

7. The method as recited in claim 1, wherein the outputting comprises providing the operator with quantitative information via a display.

8. The method as recited in claim 1, wherein the outputting comprises outputting an alarm to the operator.

9. The method of claim 1, further comprising:
adjusting operation of the telemetry system to reduce or overcome the problem.

10. A system for diagnosing a telemetry system deployed in a drilling system, the system comprising:
a telemetry system deployed in a drill string deployed in a wellbore, the wellbore extending downhole from a rig at a surface location, the telemetry system configured to transmit signals from a bottom of the wellbore to a surface location;

a diagnostic system including (i) a facts database configured to receive first, second, third, and fourth sensor data, the first sensor data obtained from a rig sensor, the second sensor data obtained from a downhole sensor, the third sensor data obtained from a telemetry sensor, and the fourth sensor data obtained from a surface sensor, (ii) a rules database including a plurality of logical rules that link states of operation of the drilling system, and (iii) an inference engine configured to process the data in the facts database in combination with the logical rules to determine whether states of operation indicated by the data match states indicating a problem with operation of the telemetry system; and wherein the diagnostic system is deployed in a surface control system and wherein the surface control system is further configured to automatically address the problem by sending control signals downhole to the telemetry system at the bottom of the wellbore.

11. The system as recited in claim 10, wherein the surface control system comprises an output device for displaying information based on data processed by the diagnostic system.

12. The method as recited in claim 1, wherein the first sensor data comprise data selected from the group consisting of pumping/circulating data, downlink data, and drilling data.

13. The method as recited in claim 1, wherein the second sensor data comprise data selected from the group consisting of signal jamming data, sliding data, turbine rotation data, and stick-slip data.

14. The method as recited in claim 1, wherein the third sensor data comprise data selected from the group consisting of signal energy data, mud pump noise data, drilling noise data, and telemetry mode data.

15. The method as recited in claim 1, wherein the fourth sensor data comprise data selected from the group consisting of selected telemetry mode data, types of sensors employed data, selected receivers/transceivers data, and types of noise cancellers employed data.

16. The method of claim 1, further comprising:
automatically selecting desired telemetry parameters to optimize performance of the telemetry system during said operating the telemetry system.

* * * * *